(12) United States Patent
Kitazoe et al.

(10) Patent No.: US 8,971,933 B2
(45) Date of Patent: Mar. 3, 2015

(54) METHOD AND APPARATUS FOR DETERMINING DRX CYCLE USED FOR PAGING

(75) Inventors: Masato Kitazoe, Hachiouji (JP); Osok Song, San Diego, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1017 days.

(21) Appl. No.: 12/619,927

(22) Filed: Nov. 17, 2009

(65) Prior Publication Data

US 2010/0130237 A1    May 27, 2010

Related U.S. Application Data

(60) Provisional application No. 61/115,848, filed on Nov. 18, 2008.

(51) Int. Cl.
*H04W 68/00* (2009.01)
*H04W 76/04* (2009.01)
*H04W 68/12* (2009.01)

(52) U.S. Cl.
CPC ............ *H04W 76/048* (2013.01); *H04W 68/12* (2013.01)
USPC ........... 455/458; 455/574; 455/522; 370/311; 370/328

(58) Field of Classification Search
USPC ............ 455/458, 572–574, 522, 69; 370/311, 370/318, 328, 329
See application file for complete search history.

(56) References Cited

U.S. PATENT DOCUMENTS

| 7,496,060 | B2 * | 2/2009 | Ramirez et al. | 370/311 |
| 7,760,676 | B2 * | 7/2010 | Demirhan et al. | 370/311 |
| 7,916,675 | B2 * | 3/2011 | Dalsgaard et al. | 370/311 |
| 7,957,360 | B2 * | 6/2011 | Suzuki et al. | 370/341 |
| 8,023,442 | B2 * | 9/2011 | Kim et al. | 370/311 |
| 8,045,507 | B2 * | 10/2011 | Kim et al. | 370/328 |
| 8,060,122 | B2 * | 11/2011 | Tseng | 455/458 |

(Continued)

FOREIGN PATENT DOCUMENTS

| EP | 1499144 A1 | 1/2005 |
| EP | 1511337 A1 | 3/2005 |

(Continued)

OTHER PUBLICATIONS

International Search Report—PCT/US2009/065010—International Search Authority, European Patent Office, Jun. 15, 2010.

(Continued)

*Primary Examiner* — Sharad Rampuria
(74) *Attorney, Agent, or Firm* — Larry Moskowitz

(57) ABSTRACT

Techniques for determining a discontinuous reception (DRX) cycle used to receive paging are described. A user equipment (UE) may have (i) a first DRX cycle used by a first network (e.g., a core network) to page the UE and (ii) a second DRX cycle used by a second network (e.g., a RAN) to page the UE. In an aspect, the UE may use the longer DRX cycle and ignore the shorter DRX cycle, when allowed, to extend battery life. In one design, the UE may receive an indication of whether the second DRX cycle can be ignored or is to be considered by the UE. The UE may use the longer DRX cycle if the second DRX cycle can be ignored and may receive paging from the first network and/or the second network based on the longer DRX cycle. In another aspect, the UE may negotiate a DRX cycle with a network.

32 Claims, 7 Drawing Sheets

(56) References Cited

U.S. PATENT DOCUMENTS

| | | | |
|---|---|---|---|
| 8,085,694 B2* | 12/2011 | Wu et al. | 370/305 |
| 8,195,164 B2* | 6/2012 | Kazmi | 455/436 |
| 8,238,837 B2* | 8/2012 | Womack et al. | 455/68 |
| 2003/0153370 A1* | 8/2003 | Sako | 455/574 |
| 2005/0148348 A1 | 7/2005 | Cramby et al. | |
| 2006/0126577 A1* | 6/2006 | Yano et al. | 370/337 |
| 2008/0064415 A1* | 3/2008 | Willey | 455/458 |
| 2008/0232310 A1 | 9/2008 | Xu | |
| 2010/0184458 A1* | 7/2010 | Fodor et al. | 455/522 |
| 2011/0002281 A1* | 1/2011 | Terry et al. | 370/329 |

FOREIGN PATENT DOCUMENTS

| | | |
|---|---|---|
| JP | 2009512391 A | 3/2009 |
| JP | 2010517481 A | 5/2010 |
| WO | 03058992 A1 | 7/2003 |
| WO | 2007052917 A1 | 5/2007 |
| WO | WO2007149732 A1 | 12/2007 |

OTHER PUBLICATIONS

LG Electronics: "R2-070265, DRX Scheme" Internet Citation May 12, 2006, XP002450413 Retrieved from the Internet: URL:http://WWW.3gpp.org/ftp/tsg_ran/WG2_RL2/TSGR2_56bis/documents/R2-070265.zip> [Retrieved on Sep. 10, 2007] eNB decides and communicates DRX to UE;paragraph [0002].

QUALCOMM Europe: "Paging for LTE" 3GPP Draft; R2-061200, 3rd Generation Partnership Project (3GPP), Mobile Competence Centre; 650, Route Des Lucioles; F-06921 Sophia-Antipolis Cedex; France, vol. RAN WG2, no. Shanghai, China; 20060503, May 3, 2006.

Written Opinion—PCT/US2009/065010—ISA/EPO—Jun. 15, 2010.

European Search Report—EP12193774, Search Authority—The Hague Patent Office, Jan. 21, 2013.

Nokia: "Discontinuous Reception (DRX)", 3GPP Draft; GP-012610 DRX & NMOS for Geran IU, 3rd Generation Partnership Project (3GPP), Mobile Competence Centre; 650, Route Des Lucioles; F-06921 Sophia-Antipolis Cedex; France, vol. TSG Geran, no. Cancun; Nov. 23, 2001, XP050004481, [retrieved on Nov. 23, 2011].

RAN2. "Liaison Statement on DRX parameter", 3GPP Draft; N1-030957 LS IN, 3rd Generation Partnership Project (3GPP), Mobile Competence Centre; 658, Route Des Lucioles; F-06921 Sophia-Antipolis Cedex; France, vol. CN WG1, no. Sophia-Antipolis, France; Aug. 25, 2003-Aug. 29, 2003, May 31, 2003, XP058582724, [retrieved on May 31, 2003].

Taiwan Search Report—TW098139145—TIPO—May 25, 2013.

* cited by examiner

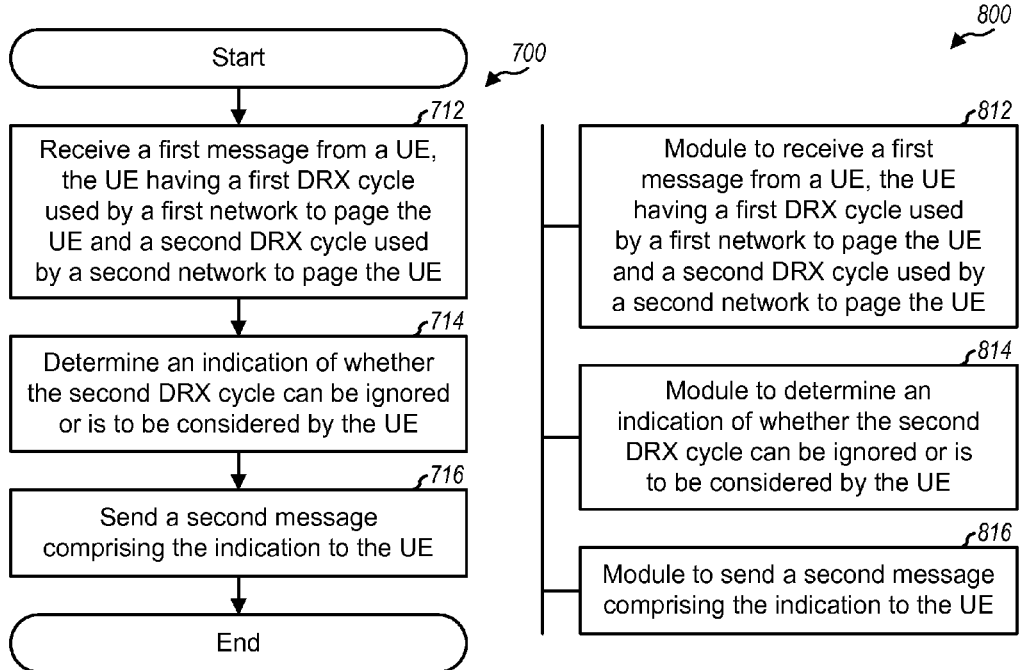
FIG. 7
FIG. 8
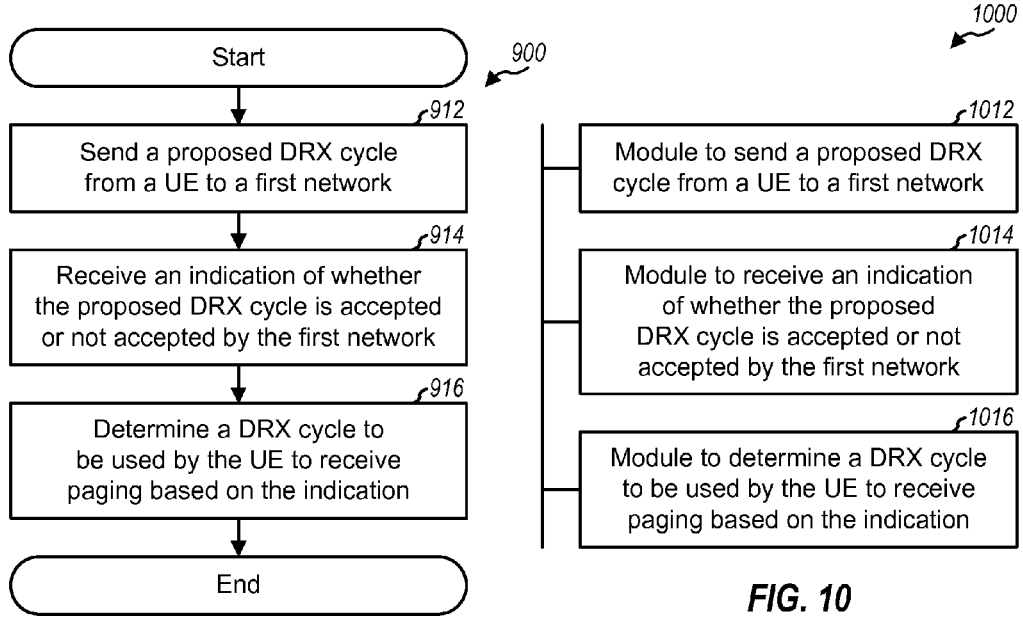
FIG. 9
FIG. 10

METHOD AND APPARATUS FOR DETERMINING DRX CYCLE USED FOR PAGING

The present application claims priority to provisional U.S. Application Ser. No. 61/115,848, entitled "A METHOD AND APPARATUS FOR DRX CYCLE DETERMINATION," filed Nov. 18, 2008, assigned to the assignee hereof and incorporated herein by reference.

BACKGROUND

I. Field

The present disclosure relates generally to communication, and more specifically to techniques for determining a discontinuous reception (DRX) cycle to be used by a user equipment (UE) to receive paging.

II. Background

A UE in a wireless communication network (e.g., a cellular phone in a cellular network) may operate in one of several modes, such as an idle mode or a connected mode, at any given moment. In the connected mode, the UE may actively exchange data with one or more base stations, e.g., for a voice call or a data call. In the idle mode, the UE may power down much of the time to conserve battery power and may wake up periodically to monitor for paging messages applicable for the UE. The paging messages may alert the UE to the presence of incoming calls and/or may provide other information.

The UE may periodically monitor for paging messages based on a DRX cycle. The DRX cycle may indicate when the UE should monitor for paging messages and when the UE may power down to save battery power. If the DRX cycle is too long, then there may be long delays in sending paging messages to the UE. Conversely, if the DRX cycle is too short, then the UE may monitor for paging messages too frequently and may consume too much battery power. It may be desirable to determine an appropriate DRX cycle for the UE.

SUMMARY

Techniques for determining a DRX cycle to be used by a UE to receive paging are described herein. The UE may have (i) a first DRX cycle used by a first network (e.g., a core network) to page the UE and (ii) a second DRX cycle used by a second network (e.g., a radio access network (RAN)) to page the UE. The DRX cycle for each network may be determined based on the requirements of paging for that network. The first DRX cycle may have a different (e.g., longer) duration/length than that of the second DRX cycle.

In an aspect, the UE may use the longer DRX cycle and may ignore the shorter DRX cycle, when allowed, in order to extend battery life and/or obtain other benefits. In one design, the UE may receive an indication of whether the second DRX cycle can be ignored or is to be considered by the UE. This indication may come from the first network or the second network. The UE may use the longer DRX cycle if the second DRX cycle can be ignored by the UE and is shorter than the first DRX cycle. The UE may receive paging from the first network and/or the second network based on the longer DRX cycle.

In another aspect, the UE may negotiate a DRX cycle with a network (e.g., the core network) to ensure that both the UE and the network can support the DRX cycle and to avoid de-synchronization between the UE and the network. In one design, the UE may send a proposed DRX cycle to the network and may receive an indication of whether the proposed DRX cycle is accepted or not accepted by the network. The UE may also receive an accepted DRX cycle from the network, which may or may not match the proposed DRX cycle. The UE may determine a DRX cycle to use to receive paging based on (i) the proposed DRX cycle if it is accepted by the network, (ii) the accepted DRX cycle if it is received from the network, or (iii) another DRX cycle for another network (e.g., the RAN) if the proposed DRX cycle is not accepted and the accepted DRX cycle is not received.

Various aspects and features of the disclosure are described in further detail below.

BRIEF DESCRIPTION OF THE DRAWINGS

FIG. 7 shows a process for supporting paging by a network.

FIG. 8 shows an apparatus for supporting paging by the network.

FIG. 9 shows a process for negotiating a DRX cycle.

FIG. 10 shows an apparatus for negotiating a DRX cycle.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
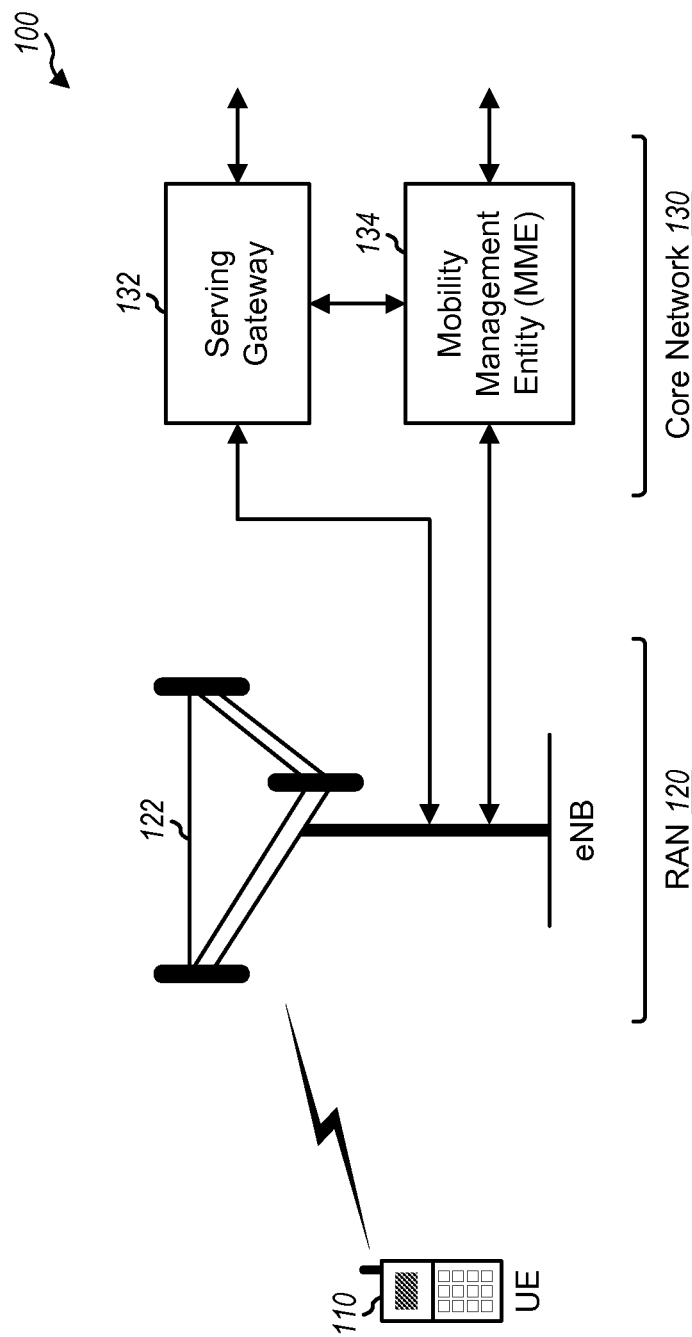
FIG. 1 shows a wireless communication network.

FIG. 1 shows a wireless communication network 100, which may be an LTE network or some other wireless network. Wireless network 100 includes a RAN 120 and a core network (CN) 130. RAN 120 supports radio communication for UEs within its coverage area and may also be referred to as a Universal Terrestrial Radio Access Network (UTRAN) or an Evolved UTRAN (E-UTRAN). Core network 130 supports various services for UEs.

RAN 120 may include a number of evolved Node Bs (eNBs) and possibly other network entities. For simplicity, only one eNB 122 is shown in FIG. 1 for RAN 120. eNB 122 may be a station that communicates with the UEs and may also be referred to as a Node B, a base station, an access point, etc. Core network 130 may include various network entities described by 3GPP. For simplicity, only one serving gateway 132 and only one mobility management entity (MME) 134 are shown in FIG. 1 for core network 130. Serving gateway 132 may support data services such as packet data, Voice-over-Internet Protocol (VoIP), video, messaging, etc. MME 134 may be responsible for mobility management and path switching between eNBs at handover. MME 134 may also perform paging for core network 130. Serving gateway 132 and MME 134 may communicate with other entities, e.g., remote servers and terminals.

FIG. 1 shows some network entities that may be present in an LTE network. Other wireless networks may include equivalent network entities. For example, a UTRAN supporting WCDMA may include node Bs (instead of eNBs) coupled to Radio Network Controllers (RNCs). A core network for UMTS may include Mobile Switching Centers (MSCs), Serving GPRS Support Nodes (GGSNs), and Gateway GPRS Support Nodes (GGSNs) (instead of serving gateways and MMEs).

A UE 110 may communicate with eNB 122 in RAN 130 and may also communicate with serving gateway 132 and MME 134 in core network 130. UE 110 may communicate with network entities in RAN 120 via lower layer signaling and may communicate with network entities in core network 130 via upper layer signaling, e.g., Non Access Stratum (NAS) signaling in UMTS and LTE. UE 110 may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

In UMTS and LTE, UE 110 may indicate a paging DRX cycle to core network 130 via NAS signaling, e.g., during an attach procedure or a tracking area update procedure. This paging DRX cycle may be referred to as a CN DRX cycle and may be specific to UE 110. This mechanism may allow UE 110 to change the CN DRX cycle depending on a particular service being received by UE 110, a particular device type of UE 110, and/or other factors. Core network 130 may send paging messages to UE 110 in time intervals determined by the CN DRX cycle. These paging messages may alert UE 110 to incoming calls and/or may be used for other purposes.

RAN 120 may also have a paging DRX cycle that may be applicable for all UEs within the coverage of RAN 120. This paging DRX cycle may be referred to as a RAN DRX cycle. RAN 120 may broadcast parameters for the RAN DRX cycle in system information to the UEs. RAN 120 may send paging messages to its UEs in time intervals determined by the RAN DRX cycle. These paging messages may alert the UEs to changes in system information and/or may be used for other purposes.

UE 110 may have a CN DRX cycle for core network 130 as well as a RAN DRX cycle for RAN 120. In general, the CN DRX cycle may be the same as, or different from, the RAN DRX cycle. If the CN DRX cycle is different from the RAN DRX cycle, then UE 110 may use the shorter of the CN DRX cycle and the RAN DRX cycle. The DRX cycle for each network (e.g., the RAN or the core network) may be determined based on the desired reliability and delay requirements for paging by that network. The use of the shorter DRX cycle by UE 110 would ensure that the requirements of both RAN 120 and core network 130 can be satisfied.

Figure 2:
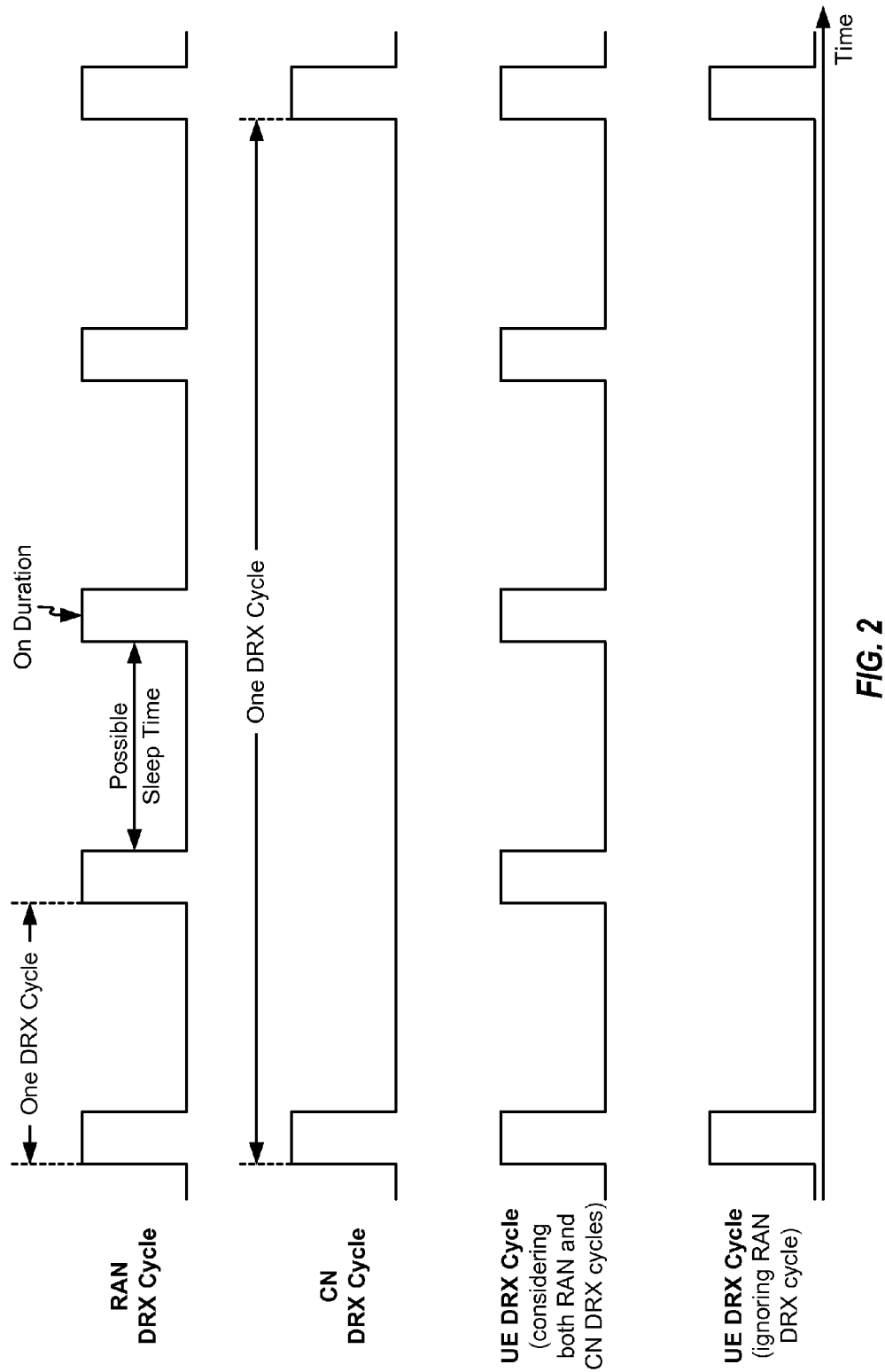
FIG. 2 shows exemplary DRX cycles for a RAN and a core network for a UE.

FIG. 2 shows an exemplary CN DRX cycle and an exemplary RAN DRX cycle for UE 110. The RAN DRX cycle may have a particular overall duration and a particular On duration, which may be defined by RAN 120. UE 110 may listen for paging messages from RAN 120 during the On duration of the RAN DRX cycle. UE 110 may power down during the remaining duration of the RAN DRX cycle, if there are no other tasks to perform, in order to conserve battery power. The CN DRX cycle may also have a particular overall duration and a particular On duration, which may be defined by UE 110 and provided to core network 130. UE 110 may listen for paging messages from core network 130 during the On duration of the CN DRX cycle. UE 110 may power down during the remaining duration of the CN DRX cycle, if there are no other tasks to perform, in order to conserve battery power.

In the example shown in FIG. 2, the CN DRX cycle is four times longer than the RAN DRX cycle. UE 110 may then use the shorter RAN DRX cycle instead of the longer CN DRX cycle, as shown in FIG. 2, in order to satisfy the requirements of both RAN 120 and core network 130.

A longer DRX cycle may be desirable for certain applications. For example, UE 110 may be a sensor device that may very infrequently engage in machine-to-machine communication to exchange data with one or more other devices. The longer DRX cycle may allow UE 110 to sleep for a larger percentage of time, which may then extend battery life of UE 110. However, the longer DRX cycle may not be possible with the paging mechanism described above since the RAN DRX cycle is typically short (e.g., on the order of seconds) in order to achieve a reasonable level of reliability for RAN purposes. The longer DRX cycle desired by UE 110 may be on the order of minutes, or hours, or even days.

In an aspect, UE 110 may use the longer CN DRX cycle and may ignore the shorter RAN DRX cycle when applicable, as shown at the bottom of FIG. 2. For example, there may be a service contract/agreement between a network operator and a user that may allow UE 110 to ignore the RAN DRX cycle. As another example, UE 110 may be able to implement a work around to achieve similar goal as the one achieved by the RAN DRX cycle. In any case, UE 110 may be able to extend battery life and/or obtain other benefits by using the longer CN DRX cycle and ignoring the shorter RAN DRX cycle.

In general, the RAN DRX cycle may be ignored if the consequences of doing it are known. For example, the design of the network architecture by the network operator across RAN 120 and core network 130 may allow the RAN DRX cycle to be ignored without encountering adverse consequences. However, there may be cases in which RAN 120 and core network 130 may independently handle their DRX cycles. Each network may assume that the reliability requirements of that network can be achieved with the DRX cycle for that network, regardless of the duration of the DRX cycle for the other network. This independent operation may be true in many deployments of UMTS and LTE networks. In these cases, it may be desirable to control whether UE 110 can ignore the RAN DRX cycle.

Figure 3A:
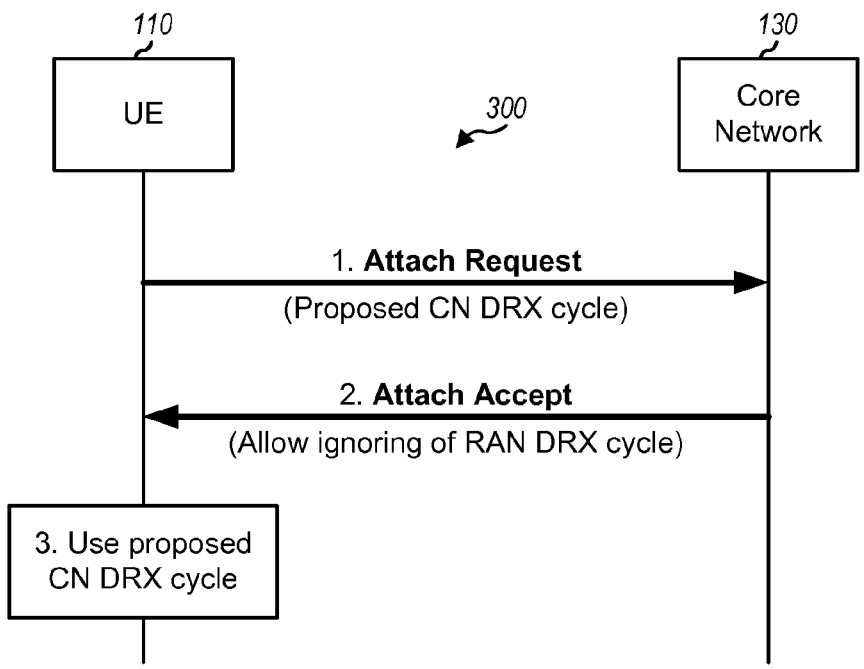
FIGS. 3A and 3B show two message flows for controlling whether the UE can ignore the DRX cycle from the RAN.

FIG. 3A shows a design of a message flow 300 for controlling whether UE 110 can ignore the RAN DRX cycle. UE 110 may send an Attach Request message to core network 130 for an attach procedure (step 1). This message may include a CN DRX cycle proposed by UE 110. Core network 130 may receive the Attach Request message from UE 110 and may determine that UE can ignore the RAN DRX cycle. Core network 130 may then return an Attach Accept message to UE 110 (step 2). This message may include an indication that UE can ignore the RAN DRX cycle. In one design, the indication may be implemented with a flag that may be (i) present to indicate that UE 110 can ignore the RAN DRX cycle or (ii) omitted to indicate that UE 110 should consider the RAN DRX cycle. The indication may also be implemented with a parameter, a field, a bit, etc. UE 110 may receive the Attach Accept message and extract the indication. UE 110 may use the proposed CN DRX cycle and may ignore the RAN DRX cycle based on the received indication (step 3).

Figure 3B:
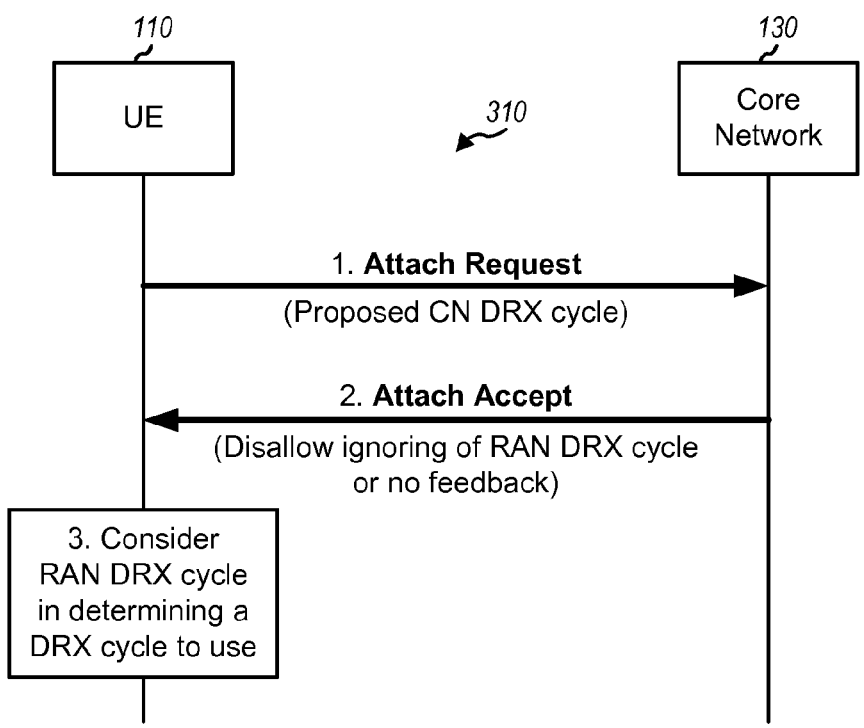

FIG. 3B shows a design of a message flow 310 for controlling whether UE 110 can ignore the RAN DRX cycle. UE 110 may send an Attach Request message with a proposed CN DRX cycle to core network 130 (step 1). Core network 130 may receive the Attach Request message and may determine that UE 110 should not ignore the RAN DRX cycle. Core network 130 may then return an Attach Accept message with an indication that UE 110 should not ignore the RAN DRX cycle (e.g., with no flag) (step 2). UE 110 may receive the Attach Accept message and obtain the indication. UE 110 may then consider both the RAN DRX cycle and the proposed CN DRX cycle to determine which DRX cycle to use to receive paging (step 3).

FIGS. 3A and 3B show a design in which core network 130 can return an indication of whether or not UE 110 can ignore the RAN DRX cycle in the Attach Accept message. Core network 130 may also send this indication in other messages, e.g., in NAS messages used for the tracking area update procedure and/or other procedures.

FIGS. 3A and 3B show a design in which core network 130 can control whether or not UE 110 can ignore the RAN DRX cycle. Core network 130 typically has knowledge of the RAN DRX cycle and may be able to determine whether or not the RAN DRX cycle can be ignored. Core network 130 may send an indication (e.g., a flag) for this purpose. UE 110 may determine that it can ignore the RAN DRX cycle only if allowed by the indication (e.g., a flag) from core network 130. UE 110 may determine that it should not ignore the RAN DRX cycle if this is conveyed by the indication (e.g., no flag) from core network 130. Legacy core networks may not support the indication and may return the Attach Accept message without this indication. These legacy core networks can implicitly disallow UEs from ignoring the RAN DRX cycle by omitting the indication in the Attach Accept messages.

In another design, RAN 120 may control whether or not UE 110 can ignore the RAN DRX cycle. UE 110 may send a message with a request to ignore the RAN DRX cycle. RAN 120 may determine whether or not UE 110 can ignore the RAN DRX cycle. RAN 120 may autonomously make this determination or may communicate with core network 130 to make this determination. In any case, RAN 120 may send an indication to UE 110 to indicate whether or not UE 110 can ignore the RAN DRX cycle. UE 110 may either consider or ignore the RAN DRX cycle based on the indication received from RAN 120.

In yet another design, UE 110 may determine whether or not it can ignore the RAN DRX cycle. UE 110 may be preconfigured (e.g., during a provisioning phase) with an indication of whether or not UE 110 can ignore the RAN DRX cycle. UE 110 may also be dynamically configured (e.g., via over-the-air signaling) with an indication of whether or not UE 110 can ignore the RAN DRX cycle. In any case, UE 110 may either consider or ignore the RAN DRX cycle based on the indication configured on UE 110.

Legacy core networks may support an old protocol version, which may support a first set of values for the CN DRX cycle. Newer core networks may support a new protocol version, which may support a second set of values for the CN DRX cycle. The second set may include one or more larger/extended values that may not be included in the first set.

UE 110 may support the new protocol version and may not know if core network 130 supports the extended values for the CN DRX cycle. UE 110 may propose an extended CN DRX cycle without knowing whether or not core network 130 supports the extended CN DRX cycle. De-synchronization between UE 110 and core network 130 may occur if UE 110 uses the extended CN DRX cycle and core network 130 does not support it.

In another aspect, UE 110 may negotiate the CN DRX cycle with core network 130 to ensure that both UE 110 and core network 130 can support the CN DRX cycle. This may avoid de-synchronization between UE 110 and core network 130.

Figure 4A:
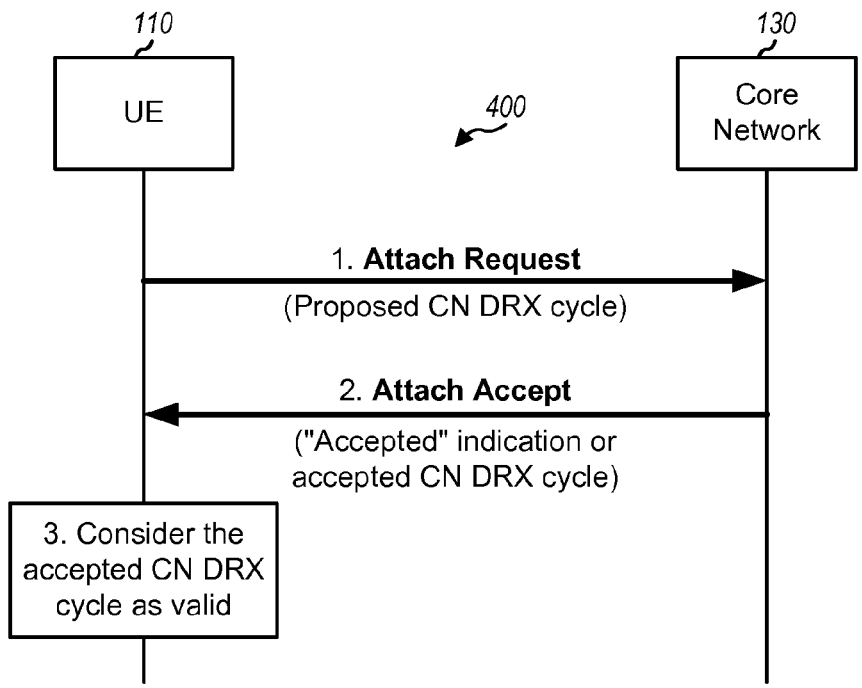
FIGS. 4A and 4B show two message flows for negotiating a DRX cycle.

FIG. 4A shows a design of a message flow 400 for negotiating the CN DRX cycle. UE 110 may send an Attach Request message with a proposed CN DRX cycle to core network 130 (step 1). Core network 130 may receive the Attach Request message and may accept the proposed CN DRX cycle from UE 110. Alternatively, core network 130 may select a CN DRX cycle for UE 110, which may be different from the proposed CN DRX cycle. In any case, core network 130 may return an Attach Accept message with an "accepted" indication or an accepted CN DRX cycle (step 2). The "accepted" indication may indicate that the proposed CN DRX cycle from UE 110 has been accepted. The accepted CN DRX cycle may be equal to the proposed CN DRX cycle from UE 110 or the selected CN DRX cycle from core network 130. UE 110 may receive the Attach Accept message and obtain the "accepted" indication or the accepted CN DRX cycle. UE 110 may consider the proposed CN DRX cycle to be an accepted CN DRX cycle if the "accepted" indication is received. UE 110 may consider the accepted CN DRX cycle as being valid and may use it to determine a DRX cycle to use to receive paging (step 3).

Figure 4B:
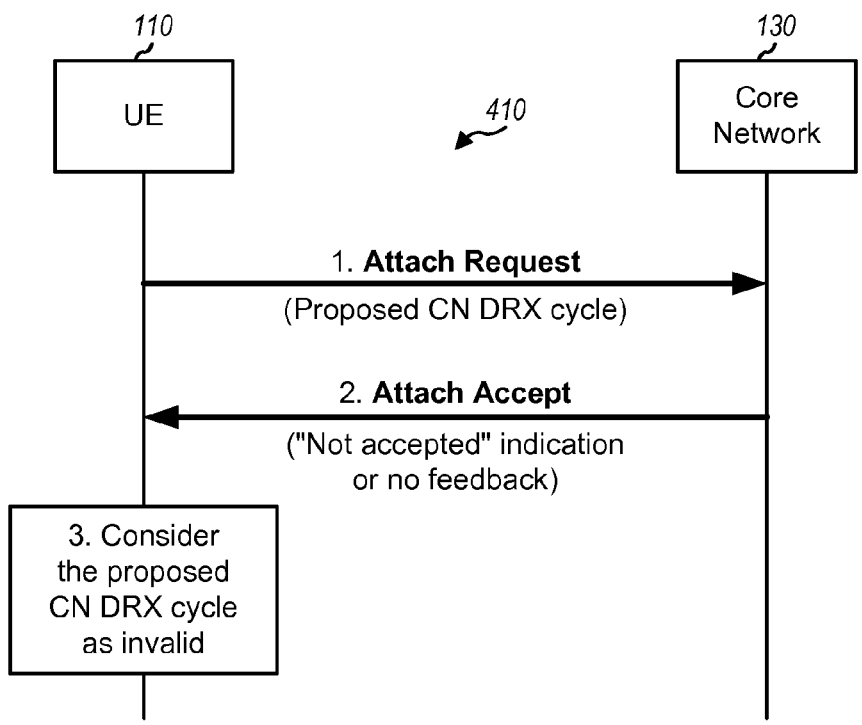

FIG. 4B shows a design of a message flow 410 for negotiating the CN DRX cycle. UE 110 may send an Attach Request message with a proposed CN DRX cycle to core network 130 (step 1). Core network 130 may receive the Attach Request message and may not accept the proposed CN DRX cycle from UE 110 or may not recognize the value of the proposed CN DRX cycle, which may be an extended value not supported by core network 130. Core network 130 may then return an Attach Accept message with a "not accepted" indication or no feedback (step 2). The "not accepted" indication or no feedback may indicate that (i) the proposed CN DRX cycle from UE 110 is recognized by core network 130 but is not accepted or (ii) the proposed CN DRX cycle from UE 110 is not recognized by core network 130 and hence not accepted. UE 110 may receive the Attach Accept message and obtain the "not accepted" indication or no feedback. UE 110 may then consider the proposed CN DRX cycle as being invalid and may use the RAN DRX cycle (step 3).

FIGS. 4A and 4B show a design in which core network 130 can return an indication of whether or not the proposed CN DRX cycle has been accepted in the Attach Accept message. Core network 130 may also send this indication in other messages, e.g., in NAS messages used for the tracking area update procedure and/or other procedures.

FIGS. 4A and 4B show a design in which core network 130 can provide feedback on whether or not the proposed CN DRX cycle from UE 110 has been accepted by core network 130. This ability to send feedback may be supported by core network 130 with the new protocol version. The feedback may be given in various forms. In one design, the feedback may comprise a binary indication of either "accepted" or "not accepted" for the proposed CN DRX cycle. UE 110 may select and send another proposed CN DRX cycle if the "not accepted" indication is received from core network 130. In another design, the feedback may comprise an accepted CN DRX cycle that core network 130 can accept/use. UE 110 may then use the accepted CN DRX cycle or may send another proposed CN DRX cycle. In yet another design, there may be no feedback from core network 130 if the proposed CN DRX cycle is not accepted or is not recognized by core network 130. UE 110 may then use the RAN DRX cycle or may send another proposed CN DRX cycle. The feedback may also comprise other information.

Several mechanisms for allowing UE 110 to use a CN DRX cycle that is longer than a RAN DRX cycle have been described above. Several mechanisms for negotiating a DRX cycle have also been described above. The use of a longer CN DRX cycle and the negotiation of a DRX cycle may also be performed in other manners.

Figure 5:
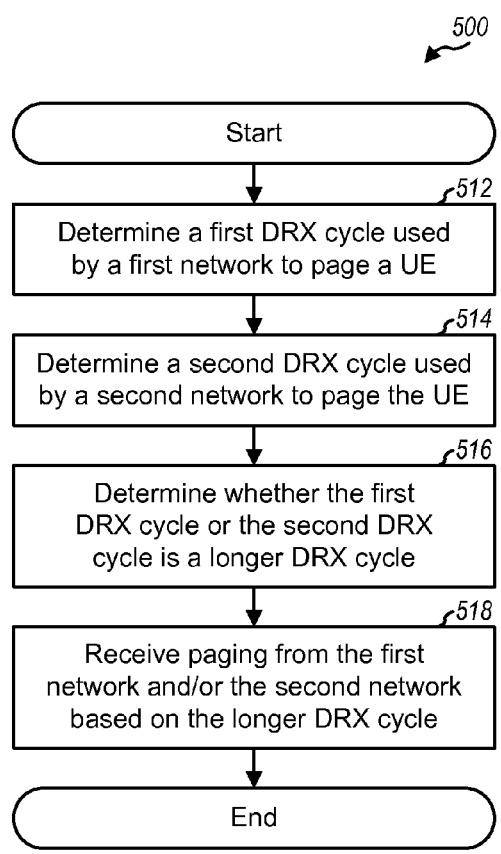
FIG. 5 shows a process for receiving paging by the UE.

FIG. 5 shows a design of a process 500 for receiving paging by a UE. The UE may determine a first DRX cycle used by a first network to page the UE (block 512). The UE may also determine a second DRX cycle used by a second network to page the UE (block 514). The first network may be a core network, the second network may be a RAN, the first DRX cycle may be a CN DRX cycle, and the second DRX cycle may be a RAN DRX cycle. The first and second networks may also be two RANs, two core networks, or any two networks of the same or different types. In one design, the first DRX cycle may be used by the first network specifically for the UE, and the second DRX cycle may be used by the second network for all UEs within the coverage of the second network. In general, each DRX cycle may be specific for the UE or general for a group of UEs.

The UE may determine whether the first DRX cycle or the second DRX cycle is a longer DRX cycle (block 516). The UE may receive paging from the first network and/or the second network based on the longer DRX cycle (block 518). In one design, the UE may receive an indication of whether the second DRX cycle can be ignored or is to be considered by the UE. This indication may come from the first network or the second network. The UE may use the longer DRX cycle if the second DRX cycle can be ignored by the UE and is shorter than the first DRX cycle. The UE may use the second DRX cycle, instead of the longer DRX cycle, if the second DRX cycle is to be considered by the UE and is shorter than the first DRX cycle.

In one design, the UE may send a first message comprising a proposed DRX cycle to the first network. The UE may receive a second message from the first network in response to the first message. The second message may include (i) an explicit indication (e.g., a flag) that the second DRX cycle can be ignored by the UE, (ii) an explicit indication (e.g., no flag) that the second DRX cycle is to be considered by the UE, or (iii) an implicit indication (e.g., no feedback) that the second DRX cycle is to be considered by the UE. The explicit or implicit indication may also be provided to the UE in other manners. The second message may also include (i) an indication that the proposed DRX cycle is accepted as the first DRX cycle or (ii) an accepted DRX cycle to be used as the first DRX cycle.

Figure 6:
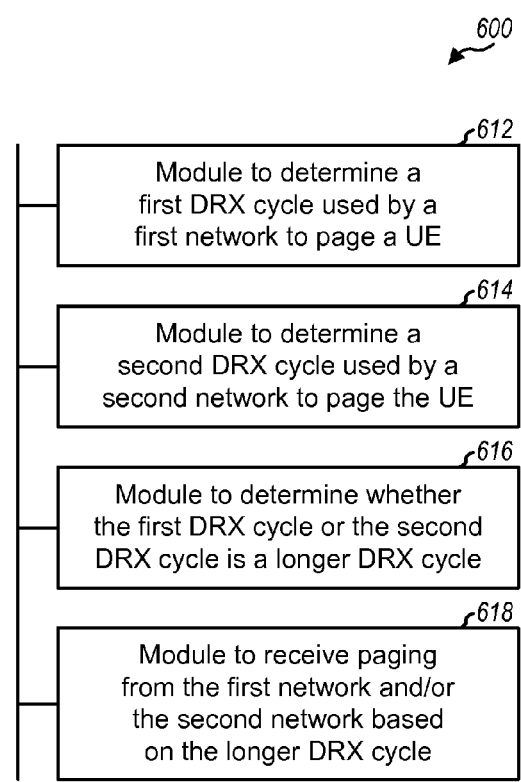
FIG. 6 shows an apparatus for receiving paging by the UE.

FIG. 6 shows a design of an apparatus 600 for receiving paging. Apparatus 600 includes a module 612 to determine a first DRX cycle used by a first network to page a UE, a module 614 to determine a second DRX cycle used by a second network to page the UE, a module 616 to determine whether the first DRX cycle or the second DRX cycle is a longer DRX cycle, and a module 618 to receive paging from the first network and/or the second network based on the longer DRX cycle.

FIG. 7 shows a design of a process 700 for supporting paging by a network. A first message may be received from a UE having (i) a first DRX cycle used by a first network to page the UE and (ii) a second DRX cycle used by a second network to page the UE (block 712). The first network may be a core network, and the second network may be a RAN. The first and second networks may also be any two networks. An indication of whether the second DRX cycle can be ignored or is to be considered by the UE may be determined (block 714). A second message comprising the indication may be sent to the UE (block 716). The UE may determine a DRX cycle to use to receive paging based on the indication. In one design, process 700 may be performed by the first network, which may receive the first message from the UE and may send the second message to the UE. Process 700 may also be performed by the second network or some other entity.

FIG. 8 shows a design of an apparatus 800 for supporting paging by a network. Apparatus 800 includes a module 812 to receive a first message from a UE, with the UE having a first DRX cycle used by a first network to page the UE and a second DRX cycle used by a second network to page the UE, a module 814 to determine an indication of whether the second DRX cycle can be ignored or is to be considered by the UE, and a module 816 to send a second message comprising the indication to the UE.

FIG. 9 shows a design of a process 900 for negotiating a DRX cycle. A UE may send a proposed DRX cycle to a first network (block 912). The UE may receive an indication of whether the proposed DRX cycle is accepted or not accepted by the first network (block 914). The UE may determine a DRX cycle to use to receive paging based on the indication (block 916).

For block 914, the UE may receive no feedback from the first network for the proposed DRX cycle. The no feedback may be considered as an implicit indication that the proposed DRX cycle is not accepted by the first network. The UE may also receive an accepted DRX cycle from the first network. The accepted DRX cycle may be considered as an implicit indication that the proposed DRX cycle (i) is accepted if it matches the accepted DRX cycle or (ii) is not accepted if it is different from the accepted DRX cycle.

The UE may also determine a second DRX cycle used by a second network to page the UE. The UE may determine the DRX cycle to use based further on the second DRX cycle. The first network may be a core network, and the second network may be a RAN. The first and second networks may also be any two networks.

The DRX cycle to be used by the UE may be determined based on the proposed DRX cycle if it is accepted by the first network. The DRX cycle to be used by the UE may be the second DRX cycle if the proposed DRX cycle is not accepted by the first network. The DRX cycle to be used by the UE may also be determined based on the accepted DRX cycle if it is received from the first network.

FIG. 10 shows a design of an apparatus 1000 for negotiating a DRX cycle. Apparatus 1000 includes a module 1012 to send a proposed DRX cycle from a UE to a first network, a module 1014 to receive an indication of whether the proposed DRX cycle is accepted or not accepted by the first network, and a module 1016 to determine a DRX cycle to be used by the UE to receive paging based on the indication.

The modules in FIGS. 6, 8 and 10 may comprise processors, electronics devices, hardware devices, electronics components, logical circuits, memories, software codes, firmware codes, etc., or any combination thereof.

Figure 11:
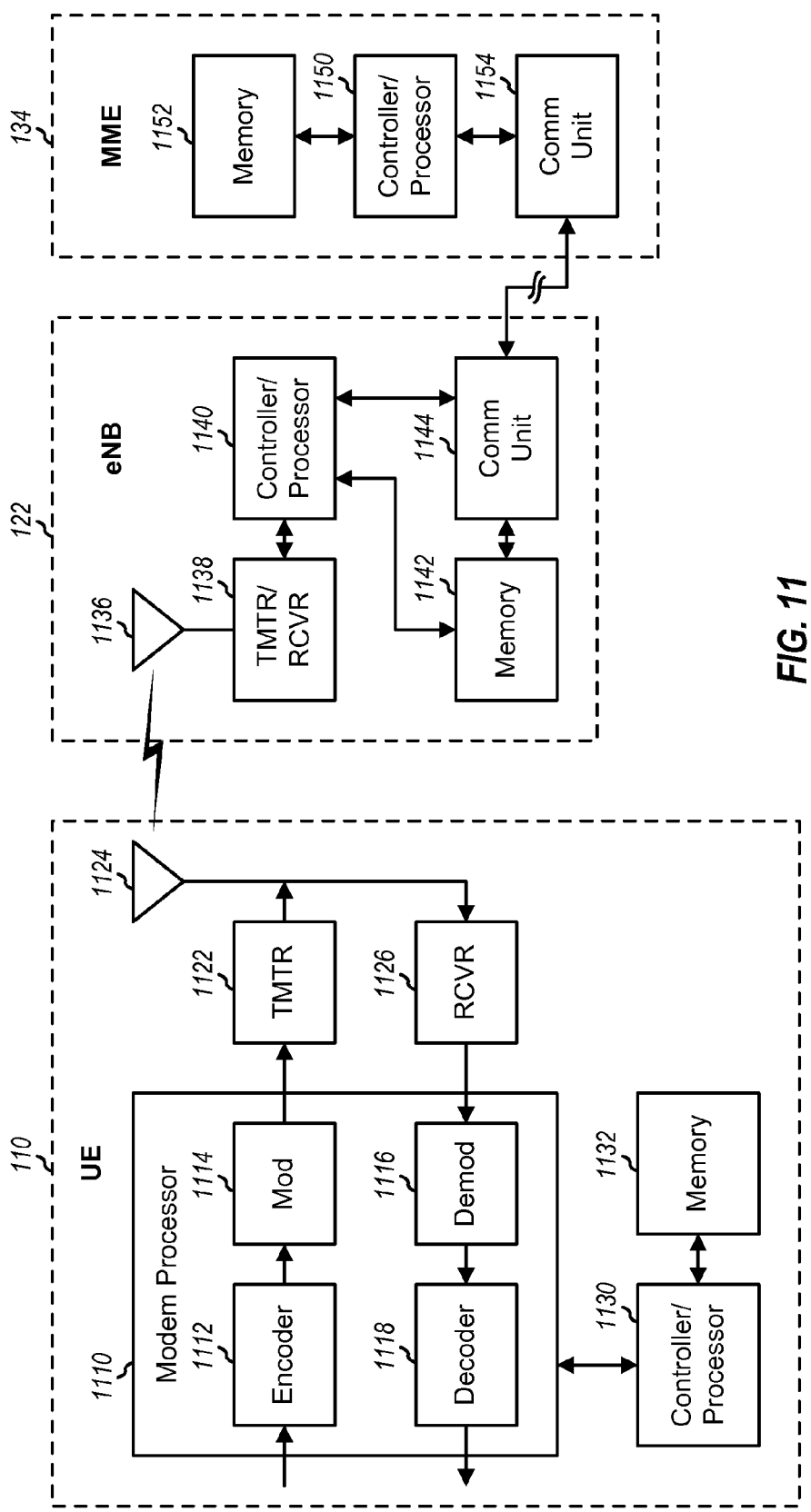
FIG. 11 shows a block diagram of the UE and two network entities.

FIG. 11 shows a block diagram of a design of UE 110, eNB 122 in RAN 120, and MME 134 in core network 130 in FIG. 1. At UE 110, an encoder 1112 may receive traffic data and signaling messages to be sent on the uplink. Encoder 1112 may process (e.g., format, encode, and interleave) the traffic data and signaling messages. A modulator (Mod) 1114 may further process (e.g., symbol map and modulate) the encoded traffic data and signaling messages and provide output samples. A transmitter (TMTR) 1122 may condition (e.g., convert to analog, filter, amplify, and frequency upconvert) the output samples and generate an uplink signal, which may be transmitted via an antenna 1124 to eNB 122.

On the downlink, antenna 1124 may receive a downlink signal transmitted by eNB 122. A receiver (RCVR) 1126 may condition (e.g., filter, amplify, frequency downconvert, and digitize) the received signal from antenna 1124 and provide input samples. A demodulator (Demod) 1116 may process (e.g., demodulate) the input samples and provide symbol estimates. A decoder 1118 may process (e.g., deinterleave and decode) the symbol estimates and provide decoded data and signaling messages sent to UE 110. Encoder 1112, modulator 1114, demodulator 1116, and decoder 1118 may be implemented by a modem processor 1110. These units may perform processing in accordance with the radio technology (e.g., LTE, WCDMA, etc.) used by RAN 120.

A controller/processor 1130 may direct the operation at UE 110. Controller/processor 1130 may also perform or direct process 500 in FIG. 5, process 900 in FIG. 9, and/or other processes for the techniques described herein. Controller/processor 1130 may also perform or direct the processing by UE 110 in FIGS. 3A, 3B, 4A and 4B. Memory 1132 may store program codes and data for UE 110.

At eNB 122, a transmitter/receiver 1138 may support radio communication with UE 110 and other UEs. A controller/processor 1140 may perform various functions for communication with the UEs. On the uplink, the uplink signal from UE 110 may be received via an antenna 1136, conditioned by receiver 1138, and further processed by controller/processor 1140 to recover the traffic data and signaling messages sent by UE 110. On the downlink, traffic data and signaling messages may be processed by controller/processor 1140 and conditioned by transmitter 1138 to generate a downlink signal, which may be transmitted via antenna 1136 to UE 110 and other UEs. Controller/processor 1140 may also perform or direct process 700 in FIG. 7 and/or other processes for the techniques described herein. Memory 1142 may store program codes and data for eNB 122. A communication (Comm) unit 1144 may support communication with other network entities.

At MME 134, a controller/processor 1150 may perform various functions to support communication services for UEs. Controller/processor 1150 may also perform or direct process 700 in FIG. 7 and/or other processes for the techniques described herein. Controller/processor 1150 may also perform or direct the processing by core network 130 in FIGS. 3A, 3B, 4A and 4B. Memory 1152 may store program codes and data for MME 134. A communication unit 1154 may support communication with other network entities.

FIG. 11 shows simplified designs of UE 110, eNB 122, and MME 134. In general, each entity may include any number of transmitters, receivers, processors, controllers, memories, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a first discontinuous reception (DRX) cycle used to page a user equipment (UE);
   determining a second DRX cycle used to page the UE;
   determining whether the first DRX cycle is a shorter DRX cycle or a longer DRX cycle compared to the second DRX cycle;
   receiving an indication of whether the second DRX cycle can be ignored or is to be considered by the UE;
   receiving paging based on the first DRX cycle if the second DRX cycle can be ignored by the UE and is shorter than the first DRX cycle; and
   receiving paging based on the second DRX cycle if the second DRX cycle is to be considered by the UE and is shorter than the first DRX cycle.

2. The method of claim 1, wherein the first DRX cycle is used by a first network specifically for the UE, and wherein the second DRX cycle is used by a second said network for all UEs within the coverage of the second network.

3. The method of claim 1, further comprising:
   sending a first message comprising the first DRX cycle to a first network.

4. The method of claim 1, further comprising:
   sending a first message comprising a proposed said DRX cycle to a network; and
   receiving a second message sent by the network in response to the first message, the second message comprising no feedback to implicitly convey the second DRX cycle is to be considered by the UE.

5. An apparatus for wireless communication, comprising:
   means for determining a first discontinuous reception (DRX) cycle used to page a user equipment (UE);
   means for determining a second said DRX cycle used to page the UE;
   means for determining whether the first DRX cycle is a shorter DRX cycle or a longer DRX cycle compared to the second DRX cycle;
   means for receiving an indication of whether the second DRX cycle can be ignored or is to be considered by the UE;
   means for receiving paging based on the first DRX cycle if the second DRX cycle can be ignored by the UE and is shorter than the first DRX cycle; and
   receiving paging based on the second DRX cycle if the second DRX cycle is to be considered by the UE and is shorter than the first DRX cycle.

6. The apparatus of claim 5, further comprising:
   means for sending a first message comprising a proposed said DRX cycle to a network; and
   means for receiving a second message comprising the indication from the network, the indication being an explicit indication that the second DRX cycle can be ignored by the UE, or an explicit indication that the second DRX cycle is to be considered by the UE, or an implicit indication that the second DRX cycle is to be considered by the UE.

7. An apparatus for wireless communication, comprising:
   at least one processor configured to determine a first discontinuous reception (DRX) cycle used to page a user equipment (UE), to determine a second DRX cycle used to page the UE, to determine whether the first DRX cycle is a shorter DRX cycle or a longer DRX cycle compared to the second DRX cycle, to receive an indication of whether the second DRX cycle can be ignored or is to be considered by the UE to receive paging based on the first DRX cycle if the second DRX cycle can be ignored by the UE and is shorter than the first DRX cycle, and to receive paging based on the second DRX cycle if the second DRX cycle is to be considered by the UE and is shorter than the first DRX cycle; and
   a memory coupled with the at least one processor.

8. The apparatus of claim 7, wherein the at least one processor is configured to send a first message comprising a proposed said DRX cycle to a network, and to receive a second message comprising the indication from the network, the indication being an explicit indication that the second DRX cycle can be ignored by the UE, or an explicit indication that the second DRX cycle is to be considered by the UE, or an implicit indication that the second DRX cycle is to be considered by the UE.

9. A non-transitory computer-readable medium comprising:
   code for causing at least one computer to determine a first discontinuous reception (DRX) cycle used to page a user equipment (UE),
   code for causing the at least one computer to determine a second DRX cycle used to page the UE,
   code for causing the at least one computer to determine whether the first DRX cycle is a shorter DRX cycle or a longer DRX cycle compared to the second DRX cycle,
   code for causing the at least one computer to receive an indication of whether the second DRX cycle can be ignored or is to be considered by the UE,
   code for causing the at least one computer to receive paging based on the first DRX cycle if the second DRX cycle can be ignored by the UE and is shorter than the first DRX cycle, and
   code for causing the at least one computer to receive paging based on the second DRX cycle if the second DRX cycle is to be considered by the UE and is shorter than the first DRX cycle.

10. A method for wireless communication, comprising:
    receiving a first message from a user equipment (UE), the UE having a first discontinuous reception (DRX) cycle used to page the UE and a second DRX cycle used to page the UE, wherein the first DRX cycle is longer than the second DRX cycle;

determining an indication of whether the second DRX cycle can be ignored or is to be considered by the UE;

sending a second message comprising the indication to the UE; and sending paging to the UE using the first or second DRX cycle based at least in part on whether the second DRX cycle can be ignored or is to be considered.

11. The method of claim 10, wherein the first DRX cyle is used specifically for the UE and wherein the second DRX cycle is used for all said UEs within the coverage of a second said network, wherein the first network is a core network and the second network is a radio access network (RAN).

12. The method of claim 10, wherein the first message is received by a network and the second message is sent by the network.

13. An apparatus for wireless communication, comprising:
means for receiving a first message from a user equipment (UE), the UE having a first discontinuous reception (DRX) cycle used to page the UE and a second DRX cycle used to page the UE, wherein the first DRX cycle is longer than the second DRX cycle;
means for determining an indication of whether the second DRX cycle can be ignored or is to be considered by the UE;
means for sending a second message comprising the indication to the UE; and
means for sending paging to the UE using the first or second DRX cycle based at least in part whether the second DRX cycle can be ignored or is to be considered.

14. A method for wireless communication, comprising:
sending a proposed first discontinuous reception (DRX) cycle from a user equipment (UE);
receiving an indication of whether the proposed DRX cycle is accepted or not accepted;
determining a second said DRX cycle used to page the UE;
determining a said DRX cycle to be used by the UE to receive paging based, at least in part, on one or more of the indication and the second DRX cycle; and
receiving paging based on the DRX cycle determined to be used by the UE.

15. The method of claim 14, wherein the first DRX cycle is used specifically for the UE, and wherein the second DRX cycle is used for all said UEs within the coverage of a second said network, wherein the first network is a core network and the second network is a radio access network (RAN).

16. The method of claim 14, wherein the DRX cycle to be used by the UE is the second DRX cycle if the proposed DRX cycle is not accepted.

17. The method of claim 14, wherein the DRX cycle to be used by the UE is determined based on the proposed DRX cycle if accepted.

18. The method of claim 14, wherein the receiving the indication comprises receiving an accepted DRX cycle, the accepted DRX cycle implicitly indicating the proposed DRX cycle being accepted if matching the accepted DRX cycle and implicitly indicating the proposed DRX cycle being not accepted if different from the accepted DRX cycle, and wherein the DRX cycle to be used by the UE is determined based on the accepted DRX cycle.

19. The method of claim 14, wherein the receiving the indication comprises receiving no feedback for the proposed DRX cycle, the no feedback implicitly indicating the proposed DRX cycle being not accepted.

20. An apparatus for wireless communication, comprising:
means for sending a proposed discontinuous reception (DRX) cycle from a user equipment (UE);
means for receiving an indication of whether the proposed DRX cycle is accepted or not accepted;
means for determining a second said DRX cycle used to page the UE;
means for determining a said DRX cycle to be used by the UE to receive paging based, at least in part, on one or more of the indication and the second DRX cycle; and
means for receiving paging based on the DRX cycle determined to be used by the UE.

21. The apparatus of claim 20, wherein the DRX cycle to be used by the UE is the second DRX cycle if the proposed DRX cycle is not accepted.

22. The apparatus of claim 20, wherein the DRX cycle to be used by the UE is determined based on the proposed DRX cycle if accepted.

23. The apparatus of claim 20, wherein the means for receiving the indication comprises means for receiving an accepted DRX cycle, the accepted DRX cycle implicitly indicating the proposed DRX cycle being accepted if matching the accepted DRX cycle and implicitly indicating the proposed DRX cycle being not accepted if different from the accepted DRX cycle, and wherein the DRX cycle to be used by the UE is determined based on the accepted DRX cycle.

24. An apparatus for wireless communication, comprising:
at least one processor configured to:
receive a first message from a user equipment (UE), the UE having a first discontinuous reception (DRX) cycle used to page the UE and a second DRX cycle used to page the UE, wherein the first DRX cycle is longer than the second DRX cycle;
determine an indication of whether the second DRX cycle can be ignored or is to be considered by the UE;
send a second message comprising the indication to the UE; and
send paging to the UE using the first or second cycle based at least in part on whether the second DRX cycle can be ignored or is to be considered; and
a memory coupled with the at least one processor.

25. The apparatus of claim 24, wherein the first DRX cycle is used specifically for the UE and wherein the second DRX cycle is used for all said UEs within the coverage of a second said network, wherein the first network is a core network and the second network is a radio access network (RAN).

26. The apparatus of claim 24, wherein the first message is received by a network and the second message is sent by the network.

27. An apparatus for wireless communication, comprising:
at least one processor configured to:
send a proposed first discontinuous reception (DRX) cycle from a user equipment (UE);
receive an indication of whether the proposed DRX cycle is accepted or not accepted;
determine a second said DRX cycle used to page the UE;
determine a said DRX cycle to be used by the UE to receive paging based, at least in part, on one or more of the indication and the second DRX cycle; and
receive paging based on the DRX cycle determined to be used by the UE; and
a memory coupled with the at least one processor.

28. The apparatus of claim 27, wherein the first DRX cycle is used specifically for the UE, and wherein the second DRX cycle is used for all said UEs within the coverage of a second said network, wherein the first network is a core network and the second network is a radio access network (RAN).

29. The apparatus of claim 27, wherein the DRX cycle to be used by the UE is the second DRX cycle if the proposed DRX cycle is not accepted.

30. The apparatus of claim 27, wherein the DRX cycle to be used by the UE is determined based on the proposed DRX cycle if accepted.

31. The apparatus of claim 27, wherein the receiving the indication comprises receiving an accepted DRX cycle, the accepted DRX cycle implicitly indicating the proposed DRX cycle being accepted if matching the accepted DRX cycle and implicitly indicating the proposed DRX cycle being not accepted if different from the accepted DRX cycle, and wherein the DRX cycle to be used by the UE is determined based on the accepted DRX cycle.

32. The apparatus of claim 27, wherein the receiving the indication comprises receiving no feedback for the proposed DRX cycle, the no feedback implicitly indicating the proposed DRX cycle being not accepted.

* * * * *